Nov. 22, 1949   J. W. ORENDORFF   2,488,735
DRIVEN FINDER FOR BEET HARVESTERS

Filed Oct. 16, 1948   2 Sheets-Sheet 1

Inventor
John W. Orendorff
Paul O. Pippel
Atty.

Nov. 22, 1949     J. W. ORENDORFF     2,488,735
DRIVEN FINDER FOR BEET HARVESTERS
Filed Oct. 16, 1948     2 Sheets-Sheet 2

Inventor
John W. Orendorff
Paul O. Pippel
Atty.

Patented Nov. 22, 1949

2,488,735

UNITED STATES PATENT OFFICE 2,488,735

DRIVEN FINDER FOR BEET HARVESTERS

John W. Orendorff, Canton, Ill., assignor to International Harvester Company, a corporation of New Jersey Application October 16, 1948, Serial No. 54,925

9 Claims. (Cl. 56—121.46)

This invention relates to toppers for beets or the like, and particularly to a feeler gauge or finder adapted to contact the beet and gauge the amount of crown to be removed therefrom by the cutter. More specifically, the invention concerns a finder of the driven, endless belt type.

A topping gauge of the driven, endless belt type is especially desirable for use with a beet harvester because of its sensitivity and accuracy. However, problems peculiar to the beet growing industry are encountered which have, until the present time, rendered the use of a finder of this type impractical. The principal disadvantage has been the tendency of the endless belt to wander and slip sidewise from its roller mount due to forces applied when obstructions exerting side thrust against the finder are encountered. Abnormal forces due to contact with angularly placed beets have a similar effect. Another disadvantage has been the ease with which lumps of dirt and other foreign matter could be thrown between the belt flights, get between the belt and the drum and dislodge the belt.

An object of this invention is to provide an improved topping mechanism for beets and the like.

Another object of the invention is to provide a beet finder or gauge of the endless belt tread type wherein provision is made to prevent displacement of the belt and consequent disabling of the topper.

A further object of the invention is to provide in a beet finder of the endless belt type means for preventing the entrance of dirt and other foreign matter.

Another object of the invention is to provide a flexible guard for the belt of a driven finder adapted to accommodate limited sidewise movement of the belt but to prevent displacement of the belt from its support and to urge it to return to a normal operating position.

Another object of the invention is to provide an improved endless belt beet finder construction wherein provision is made to limit flexing of the lower beet-engaging flight of the endless belt and prevent entrance of foreign matter between the drums and the belt.

Other objects and advantages of the invention will become clear from the following description when read in conjunction with the accompanying drawings wherein.

Figure 1:
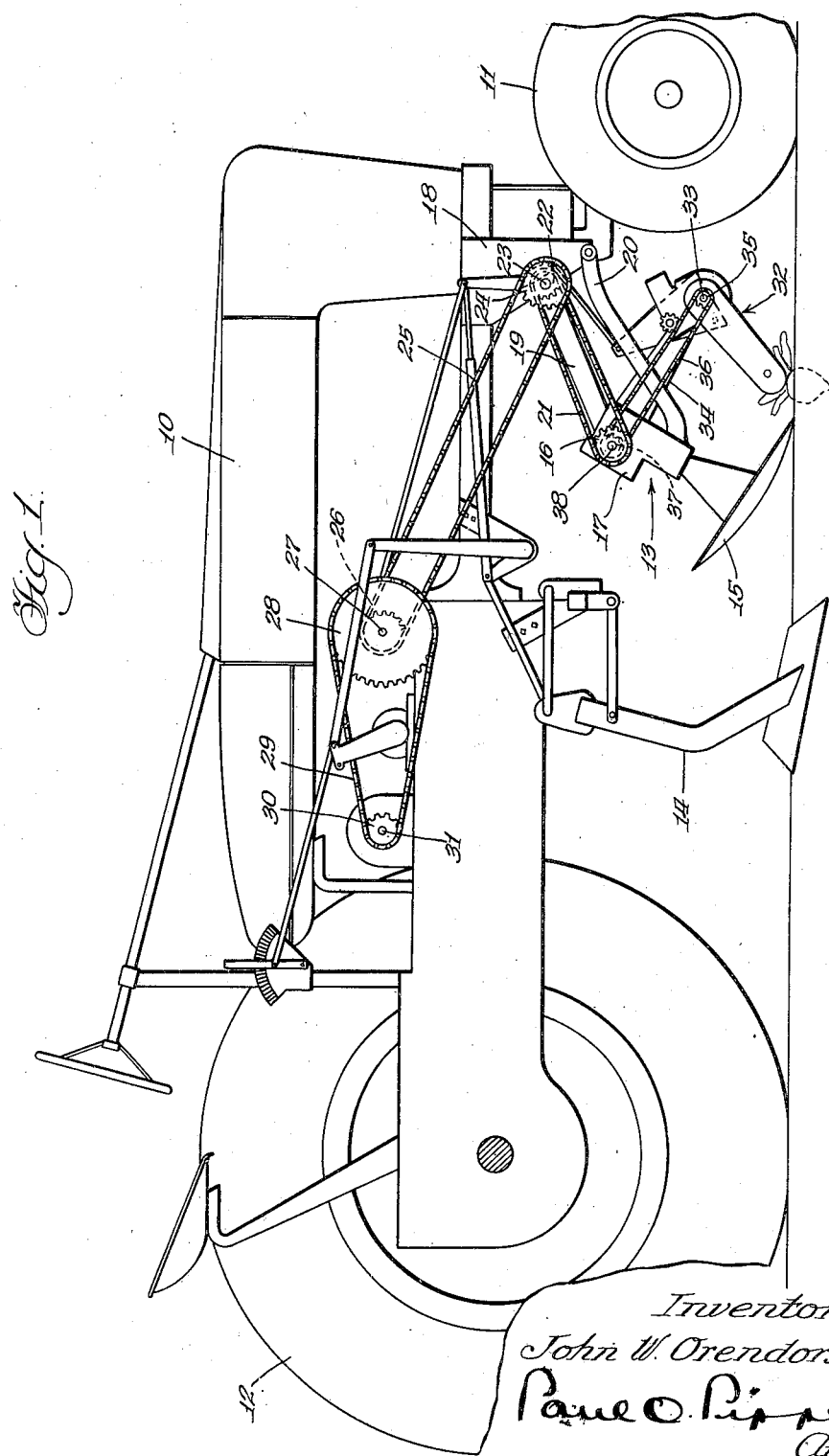
Fig. 1 is a rear view in side elevation of a tractor with one drive wheel removed showing the beet topping and gauge mechanism incorporating the features of the present invention.

According to the drawings the numeral 10 designates the body of a tractor having dirigible front wheels 11 and rear drive wheels 12. The beet harvesting mechanism, with which the feeler gauge of the present invention is utilized, is shown as mounted upon the tractor body and comprises generally the topping mechanism, designated by the numeral 13, and the digging blades 14 for removing beets from the soil after their crowns have been severed therefrom.

The topping mechanism is mounted upon the tractor for generally vertical floating movement and comprises a rotary cutting disc 15 driven by conventional gearing, not shown, through the intermediary of a sprocket wheel 16 mounted upon a casting 17 serving as a support for the cutting disc. The topping mechanism is pivotally mounted upon a plate 18 secured to the side sill of the tractor by means of links 19 and 20. Sprocket 16 is driven by a chain 21 from a sprocket 22 mounted upon a shaft 23, upon which is also mounted a sprocket wheel 24 drivingly connected by a chain 25 with a sprocket wheel 26 mounted upon a shaft 27 on the side of the tractor intermediate the ends thereof. Upon this same shaft is mounted a larger sprocket wheel 28 driven by a chain 29 and a sprocket 30 from a power takeoff shaft 31 driven from the power plant.

Inasmuch as beets in a row to be harvested differ in heights to which they project above the ground, it is desirable, in order that substantially uniform amounts of beet top will be removed from the beet, to provide a gauge mechanism associated with the disc 15 to predetermine the amount of beet top to be removed. The feeler gauge serving this function is designated by the numeral 32 and is shown in Fig. 1 as mounted in advance of the cutting blade 15. It will be noted from Fig. 1 that the feeler gauge is provided at one end with a shaft 33 which serves for the mounting of the gauge upon a bracket 34 secured to the casting 17 supporting the cutting disc 15. A sprocket wheel 35 mounted on the shaft 33 is drivingly connected by chain 36 with a sprocket wheel 37 mounted upon a shaft 38 carrying the sprocket wheel 16.

Figure 2:
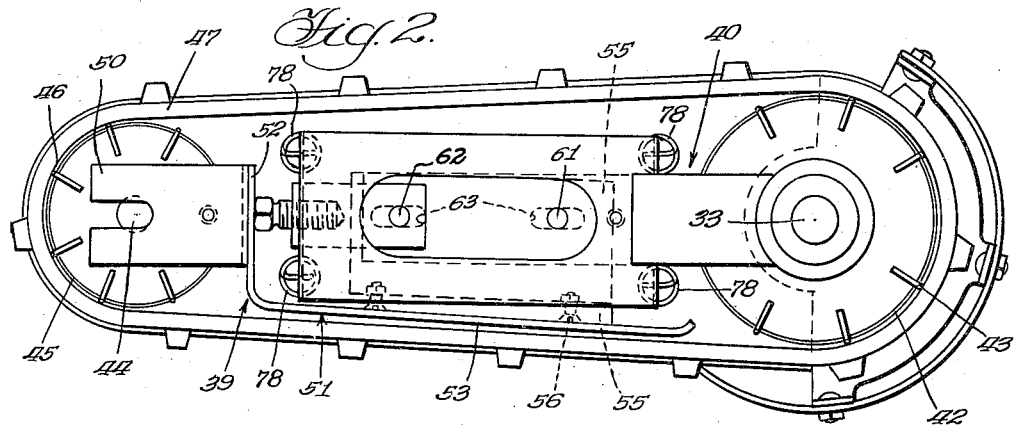
Fig. 2 is an enlarged view in side elevation of the feeler gauge of the invention.
Figure 3:
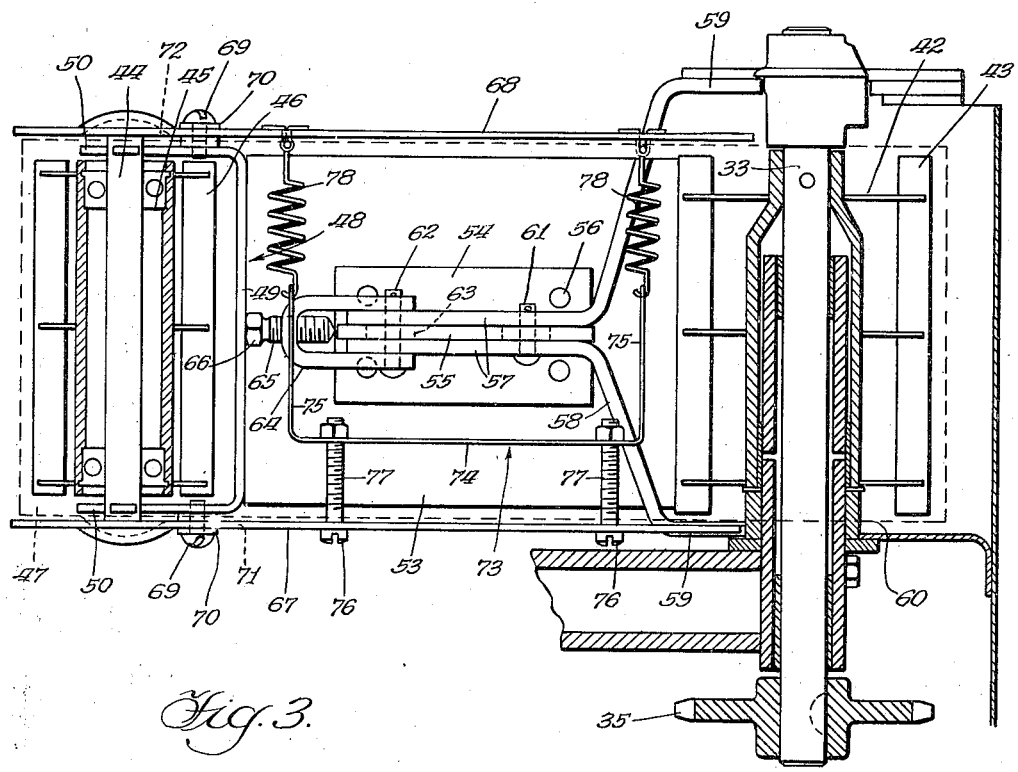
Fig. 3 is a plan view of the structure shown in Fig. 2.

As previously pointed out, beets are not only irregularly sized in the row, but are also irregularly positioned and it should be clear that a feeler gauge, such as shown at 32, is subject to considerable side thrust as it slips from one beet to another, and also from rocks or other obstructions in the row. The result is that the endless tread belt, which forms the beet engaging surface of the gauge, is subject to forces that tend to dislodge the belt from the rollers or drums upon which it is mounted. Likewise, since the gauge travels close to the ground it is subject to the danger of clods of earth becoming lodged between the belt and the drums and interfering with its proper operation. The details of construction of a feeler gauge which avoid the difficulties mentioned are illustrated in some detail in Figs. 2 and 3.

The feeler gauge of the present invention is provided with a frame structure comprising two sections 39 and 40. One end of the frame carries the shaft 33, upon which is mounted a drum 42 comprising circumferentially spaced slats 43. As pointed out before, shaft 33 provides for mounting the gauge upon the bracket 34. The other end of the frame has mounted therein a shaft 44 upon which is journaled a drum 45 likewise comprising circumferentially spaced slats 46. Around these drums is trained an endless tread belt 47, shown in solid lines in Fig. 2, and in dotted lines in Fig. 3.

Section 39 of the frame comprises a yoke 48 having a transverse portion 49 and laterally spaced arms 50 pivoted upon the ends of the shaft 44. Affixed to the transverse portion 49 of yoke 48 is a plate-like extension member 51 comprising an upwardly extending part 52 to which the yoke is affixed and a longitudinally extending portion 53. It will be noted in Fig. 2 that portion 53 of the extension member 51 extends longitudinally of the gauge, and as will be observed in Fig. 3, its width is approximately the width of the tread belt. Portion 53 extends between the drums 42 and 44 and serves as a stop to limit the flexing of the lower flight of the belt 45 when an obstruction such as a beet is encountered. This minimizes damage to the belt and other parts, and also minimizes the likelihood of foreign matter entering between the drums and the belt. A T-shaped member comprising a base portion 54 and an upright portion 55 is secured centrally of the extension member 53 by bolts 56. The upright portion 55 is adapted to be slidably received between longitudinally extending arm portions 57 of a yoke 58 having laterally spaced arms 59 mounted upon a sleeve 60 rotatable with respect to the shaft 33.

Arms 57 of yoke 58 are apertured to receive spaced pins 61 and 62. These pins register with and are passed through longitudinally extending slots 63 in the upright member 55 of frame section 39. It will thus be clear that sections 39 and 40 of the frame may be moved relatively in order to lengthen the frame and apply tension to the belt 47. In order to hold the frame section in a selected position and to adjust the length thereof, and therefore, the spacing between the drums 42 and 45, a U-shaped member 64 is provided having laterally spaced arms provided with apertures in registration with the apertures in arms 57 to receive the pins 62. The bight portion of the U-shaped member 64 is provided with a threaded bolt or screw 65 having its shank portion extending through the bight and its head 66 engaging the upright portion 52 of the extension member 51. Rotation of the screw 65 will adjust the length of the gauge frame as desired.

In order that a limited amount of axial movement of endless belt 47 with respect to the drums, and particularly drum 45, may be permitted without dislodging the belt therefrom, and in cooperation with the member 51 to keep out dirt, a pair of guard plates 67 and 68 are provided at opposite sides of the gauge and carried upon a pair of bolts 69 anchored to the laterally spaced arms of the yoke 48. Each of the bolts 69 is provided with a sleeve 70 slidably receivable in longitudinal slotted apertures 71 and 72 provided respectively in the plates 67 and 68. These plates are flexibly connected by mechanism comprising a U-shaped member 73 having a base portion 74 and transversely extending arms 75. The base portion 74 is connected to plate 67 by four bolts 76 having spacers 77 thereon. To the ends of the arms 75 are attached springs 78, the other ends of which are anchored to the plate 68; thus the plates 67 and 68 are resiliently connected and axial movement of the belt with respect to the drum is yieldably opposed. Lateral movement of the plates 67 and 68 and relative longitudinal movement thereof with respect to the frame are accommodated by the sliding of the bolts 69 in the slots 71 and 72 in either direction.

It is believed that the operation of the feeler gauge of the present invention will be clearly understood from the foregoing description. It shoud be clear that the provision of the extension frame member 51 and the side plates 67 and 68 provide a compact highly efficient beet-finder or gauge whereby the flexing of the tread belt at the point of contact with beets and other obstacles, the danger of entrance of foreign matter between the drums and the belt, and the danger of wandering or axial creeping of the belt with respect to the drums are minimized or substantially eliminated. The invention has been described in its preferred embodiment only and it should be understood that modifications may be made therein without departing from the spirit of the invention or the scope of the appended claims.

What is claimed is:

1. A driven feeler gauge, adapted for use in beet harvesters and the like to determine the amount of top to be severed from the beet, comprising a frame structure, a pair of spaced parallel drums rotatably carried by the frame, an endless tread belt connecting the drums, one of the drums being adapted to be driven, said frame structure comprising separable sections, an extension member on one frame section substantially the width of the belt and extending from one drum to the other adjacent the lower beet-engaging flight of said endless belt to limit the flexing thereof, a slotted element carried by the plate member, bolt means carried by the other section and cooperable with said slotted element to adjust the spacing between the drums, and a pair of guard plates at opposite sides of the gauge adjacent the edges of the belt to limit axial movement thereof and prevent entrance of foreign matter between the drums and the belt.

2. A driven feeler gauge adapted for use in topping mechanism for beets and the like to determine the amount of top to be severed therefrom comprising frame means, a pair of spaced parallel drum-carrying axles, one of said axles serving as a pivot by which the gauge is swingably mounted upon a support, the free end of the gauge being arranged to engage the beets, an endless tread belt mounted on said drums for rotation therewith, said frame comprising separable sections, adjustable means connecting said sections whereby the spacing between the drums may be altered to vary the tension upon the belt, a pair of guard plates having a yieldable connection therebetween, said plates being perpendicular to the axes of the drums and placed at opposite sides of the gauge assembly adjacent the edges of the belt to prevent displacement of the belt from the drums while accommodating limited lateral movement thereof relative to the drums.

3. A driven feeler gauge adapted for use in topping mechanism for beets and the like to determine the amount of top to be severed therefrom comprising frame means, a pair of spaced parallel drum-carrying axles, one of said axles serving as a pivot by which the gauge is swingably mounted upon a support, the free end of the gauge being arranged to engage the beets, an endless tread belt mounted on said drums for rotation therewith, said frame comprising separable sections, adjustable means connecting said sections whereby the spacing between the drums may be altered to vary the tension upon the belt, a pair of guard plates having a yieldable connection therebetween, said plates being perpendicular to the axes of the drums and placed at opposite sides of the gauge assembly adjacent the edges of the belt to prevent displacement of the belt from the drums while accommodating limited lateral movement thereof relative to the drums, and means accommodating adjustment of the spacing between the drums for mounting the guard plates on the frame.

4. A driven feeler gauge adapted for use in beet harvesters and the like to determine the amount of top to be severed from the beet comprising a frame structure, a pair of spaced parallel drums rotatably carried by the frame, an endless tread belt connecting the drums, one of said drums being adapted to be driven and the other said drum being arranged to engage the beets, means for adjusting the length of said frame to vary the tension upon the belt, means for offsetting forces tending to displace the belt endwise from the drums comprising a pair of guard plates at opposite sides of the gauge adapted to engage the edges of the belt and limit axial movement thereof with respect to the drums and yieldable means connecting said plates whereby flexible resistance is offered to displacement of the belt.

5. A driven feeler gauge adapted for use in beet harvesters and the like to determine the amount of top to be severed from the beet comprising a frame structure, a pair of spaced parallel drums rotatably carried by the frame, an endless tread belt connecting the drums, one of said drums being adapted to be driven and the other said drum being arranged to engage the beets, means for offsetting forces tending to displace the belt endwise from the drums comprising a pair of guard plates at opposite sides of the gauge adapted to engage the edges of the belt and limit axial movement thereof with respect to the drums and yieldable means connecting said plates whereby flexible resistance is offered to displacement of the belt.

6. A driven feeler gauge adapted for use in beet harvesters and the like to determine the amount of top to be severed from the beet comprising a frame structure, a pair of spaced parallel drums rotatably carried by the frame, an endless tread belt connecting the drums, one of said drums being adapted to be driven and the other said drum being arranged to engage the beets, means for adjusting the length of said frame to vary the tension upon the belt, means for offsetting forces tending to displace the belt endwise from the drums comprising a pair of guard plates at opposite sides of the gauge adapted to engage the edges of the belt and limit axial movement thereof with respect to the drums and yieldable means connecting said plates whereby flexible resistance is offered to displacement of the belt and means accommodating adjustment of the length of said frame for mounting the guard plates on the frame.

7. A driven feeler gauge adapted for use in beet harvesters and the like to determine the amount of top to be severed from the beet comprising a frame structure, a pair of spaced parallel drums rotatably carried by the frame, an endless tread belt connecting the drums, one of the drums being adapted to be driven, a flattened extension member forming a part of the frame substantially the width of the belt and extending between the drums adjacent the lower beet-engaging flight of said endless belt to limit the flexing thereof, and a pair of guard plates at opposite sides of the gauge adjacent the edges of the belt and spaced therefrom to limit axial movement of the belt with respect to the drums and prevent entrance of foreign matter between the drums and the belt.

8. A driven feeler gauge adapted for use in beet harvesters and the like to determine the amount of top to be severed from the beet comprising a frame structure, a pair of spaced parallel drums rotatably carried by the frame, an endless tread belt connecting the drums, one of the drums being adapted to be driven, a flattened extension member forming a part of the frame substantially the width of the belt and extending between the drums adjacent the lower beet-engaging flight of said endless belt to limit the flexing thereof, a pair of guard plates at opposite sides of the gauge adjacent the edges of the belt and spaced therefrom to limit axial movement of the belt with respect to the drums and prevent entrance of foreign matter between the drums and the belt, and spring means yieldably connecting said plates.

9. A driven feeler gauge adapted for use in beet harvesters and the like to determine the amount of top to be severed from the beet comprising a frame structure, a pair of spaced parallel drums rotatably carried by the frame, an endless tread belt connecting the drums, one of the drums being adapted to be driven, said frame structure comprising separable sections, a flattened extension member on one frame section substantially the width of the belt and extending between the drums adjacent the lower beet-engaging flight of said endless belt to limit the flexing thereof, adjustable means connecting said frame sections to alter the spacing between the drums and the tension on the belt, a pair of yieldable guard plates at opposite sides of the gauge to limit axial movement of the belt relative to the drums and prevent entrance of foreign matter, and means accommodating adjustment of the spacing between the drums for mounting the guard plates on the frame.

JOHN W. ORENDORFF.

No references cited.